United States Patent
Lee et al.

(10) Patent No.: US 9,958,723 B2
(45) Date of Patent: May 1, 2018

(54) LIQUID CRYSTAL DISPLAY DEVICE

(71) Applicant: LG DISPLAY CO., LTD., Seoul (KR)

(72) Inventors: Ho Chun Lee, Paju-si (KR); Joong Min Yoon, Goyang-si (KR); Seunghoon Ji, Jinhae-si (KR)

(73) Assignee: LG DISPLAY CO., LTD., Seoul (KR)

( * ) Notice: Subject to any disclaimer, the term of this patent is extended or adjusted under 35 U.S.C. 154(b) by 109 days.

(21) Appl. No.: 14/096,820

(22) Filed: Dec. 4, 2013

(65) Prior Publication Data
US 2014/0168584 A1 Jun. 19, 2014

(30) Foreign Application Priority Data
Dec. 18, 2012 (KR) .................. 10-2012-0148268

(51) Int. Cl.
*G02F 1/1335* (2006.01)

(52) U.S. Cl.
CPC .. *G02F 1/133514* (2013.01); *G02F 1/133512* (2013.01); *G02F 2001/133519* (2013.01); *G02F 2001/133562* (2013.01)

(58) Field of Classification Search
CPC ................................. G02F 1/133514
USPC ....................................... 349/106
See application file for complete search history.

(56) References Cited

U.S. PATENT DOCUMENTS

| | | | |
|---|---|---|---|
| 2003/0128310 A1 | 7/2003 | Takizawa et al. | |
| 2003/0223021 A1 | 12/2003 | Kaneko et al. | |
| 2004/0169794 A1* | 9/2004 | Kim | G02F 1/133516 349/106 |
| 2007/0064186 A1* | 3/2007 | Son | G02F 1/1339 349/127 |
| 2007/0182795 A1* | 8/2007 | Kim | C09D 11/30 347/100 |
| 2008/0068536 A1* | 3/2008 | Kim et al. | 349/106 |
| 2009/0061167 A1* | 3/2009 | Nishida et al. | 428/195.1 |
| 2009/0141221 A1* | 6/2009 | Taguchi et al. | 349/109 |

(Continued)

FOREIGN PATENT DOCUMENTS

| CN | 1425941 A | 6/2003 |
|---|---|---|
| CN | 1444059 A | 9/2003 |

(Continued)

OTHER PUBLICATIONS

Chinese Office Action with English translation dated Dec. 22, 2015 in Chinese Patent Application No. 201310700502.0 (14 pages total).

*Primary Examiner* — Edmond Lau
(74) *Attorney, Agent, or Firm* — Dentons US LLP

(57) ABSTRACT

Disclosed is a liquid crystal display (LCD) device which is capable of improving a user's visual perception characteristics by decreasing a reflectance difference of external light between an active area and a peripheral area, wherein the LCD device includes a first substrate having an active area and a peripheral area; a second substrate confronting the first substrate; a liquid crystal layer between the first and second substrates; a light shielding layer in the active area and the peripheral area of the first substrate; and first, second and third color filters respectively formed in individual pixels of the active area, wherein the first color filter is formed between the first substrate and the light shielding layer in the active area and the peripheral area.

20 Claims, 10 Drawing Sheets

(56) References Cited

U.S. PATENT DOCUMENTS

| | | | |
|---|---|---|---|
| 2009/0257008 A1* | 10/2009 | Yagi | G02F 1/13394 349/106 |
| 2010/0208173 A1* | 8/2010 | Kawana | C09B 67/0033 349/71 |
| 2010/0238387 A1 | 9/2010 | Chen et al. | |
| 2011/0155296 A1* | 6/2011 | Nakamura | G02B 5/201 156/67 |
| 2011/0249339 A1* | 10/2011 | Horie | G02F 1/133512 359/601 |
| 2012/0139824 A1* | 6/2012 | Takahashi et al. | 345/105 |
| 2013/0128193 A1* | 5/2013 | Yang | G02F 1/133502 349/106 |

FOREIGN PATENT DOCUMENTS

| | | |
|---|---|---|
| CN | 101840100 A | 9/2010 |
| JP | H11295707 A | 10/1999 |

* cited by examiner

FIG. 4

| | Comparative Example 1 | Comparative Example 2 | Embodiment 1 | Embodiment 2 | Embodiment 3 |
|---|---|---|---|---|---|
| Evaluation Object | S | S / BM | S / R / BM | S / G / BM | S / B / BM |
| Reflectance (%) | 7.89 | 12.03 | 10.15 | 10.38 | 8.96 |
| Reflectance except Glass (%) | | 4.13 | 2.25 | 2.48 | 1.06 |

FIG. 6

| | Comparative Example 1 | Comparative Example 2 | Embodiment 1 | Embodiment 2 | Embodiment 3 |
|---|---|---|---|---|---|
| Evaluation Object | S | S / BM | S / R G / BM | S / G B / BM | S / B R / BM |
| Reflectance (%) | 7.89 | 12.03 | 9.88 | 8.92 | 8.91 |
| Reflectance except Glass (%) | | 4.13 | 1.98 | 1.02 | 1.01 |

LIQUID CRYSTAL DISPLAY DEVICE

This application claims the benefit of the Korean Patent Application No. 10-2012-0148268 filed on Dec. 18, 2012, which is hereby incorporated by reference for all purposes as if fully set forth herein.

BACKGROUND OF THE INVENTION

Field of the Invention

The present invention relates to a liquid crystal display device, and more particularly, to a color filter substrate with a color filter formed thereon.

Discussion of the Related Art

Liquid crystal display (LCD) devices are widely used in various fields such as notebook computers, monitors, spacecraft and aircraft applications, and etc. owing to such advantages as good portability and low power consumption associated with low operating voltage.

An LCD device includes a lower substrate, an upper substrate, and a liquid crystal layer formed between the lower and upper substrates. The light transmittance is controlled by the electric field applied to the liquid crystal layer to change its alignment status, to thereby display images.

Hereinafter, an LCD device according to the related art will be described in detail. FIG. 1A is a plan view showing the related art LCD device, and FIG. 1B is a cross-sectional view along line I-I' of FIG. 1A.

As shown in FIG. 1A, the related art LCD device 1 includes an active area and a peripheral area. The active area corresponds to an area for displaying images thereon, and the peripheral area corresponds to an area surrounding the active area, on which images are not displayed.

As shown in FIG. 1B, the related art LCD device 1 includes an upper substrate 10, a lower substrate 20, and a liquid crystal layer 30. On the upper substrate 10, and more particularly, its one surface confronting the liquid crystal layer 30, are a light shielding layer 12 and a color filter layer 14. The upper substrate 10 is referred to as a color filter substrate.

The light shielding layer 12 is provided to prevent a light leakage. In the peripheral area on which images are not displayed, the light shielding layer 12 is formed on the entire region. Meanwhile, in the active area on which images are displayed, the light shielding layer 12 is formed in a matrix configuration thereon so as to prevent a light leakage in the boundaries between the pixels.

The color filter layer 14 is formed in the active area so as to display images in color. The color filter layer 14 is formed between each pattern of the light shielding layer 12 of the matrix configuration. The color filter layer 14 further includes red (R) color filters, green (G) color filters, and blue (B) color filters.

Although not shown, on the lower substrate 20, and more particularly, its one surface confronting the liquid crystal layer 30, are a thin film transistor functioning as a switching element, a pixel electrode connected with the thin film transistor, and a common electrode for forming an electric field together with the pixel electrode. The lower substrate 20 is referred to as a thin film transistor substrate.

The liquid crystal layer 30 is formed between the upper substrate 10 and the lower substrate 20. Liquid crystal molecules in the liquid crystal layer 30 are aligned by the electric field formed between the pixel electrode and the common electrode.

However, the related art LCD device may have the following disadvantages. The related art LCD device has a large reflectance difference between the active area and the peripheral area in response to external light. That is, when the external light is incident on the upper substrate 10, the incident light is reflected on the light shielding layer 12 of the peripheral area. The incident light on the active area, which passes through the color filter layer 14, is, however, reflected on the lower substrate 20. Thus, while the reflectance of incident light in the peripheral area is about 4%, the reflectance of incident light in the active area is about 1%. Thus, the user's visual perception characteristics may be deteriorated due to the large reflectance difference between the active area and the peripheral area.

SUMMARY OF THE INVENTION

Accordingly, the present invention is directed to a liquid crystal display (LCD) device that substantially obviates one or more of the problems due to limitations and disadvantages of the related art.

An advantage of the present invention is to provide an LCD device which is capable of improving a user's visual perception characteristics by decreasing a reflectance difference between the active area and the peripheral area in response to external light.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an LCD device may, for example, include a first substrate including an active area and a peripheral area; a second substrate confronting the first substrate; a liquid crystal layer between the first and second substrates; a light shielding layer in the active area and the peripheral area of the first substrate; and first, second and third color filters respectively formed in individual pixels of the active area, wherein the first color filter is formed between the first substrate and the light shielding layer in the active area and the peripheral area.

In another aspect of the present invention, an LCD device may, for example, include a first substrate including an active area and a peripheral area; a second substrate confronting the first substrate; a liquid crystal layer between the first and second substrates; and fourth, fifth and sixth color filters respectively formed in individual pixels of the active area, wherein the fourth color filter is additionally formed in a matrix configuration in the active area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 4 is a table showing the reflectance of external light when a first color filter according to an embodiment of the present invention is changed to various color filters;

FIG. 6 is a table showing the reflectance of external light when a first color filter according to another embodiment of the present invention is changed to various color filters;

DETAILED DESCRIPTION OF THE ILLUSTRATED EMBODIMENTS

Reference will now be made in detail to embodiments of the present invention, examples of which are illustrated in the accompanying drawings. The same reference numbers may be used throughout the drawings to refer to the same or like parts. When a first element is positioned "on" a second structure, it should be understood that the first and second elements may be brought into contact with each other, or a third element may be interposed between the first and second elements.

Figure 2:
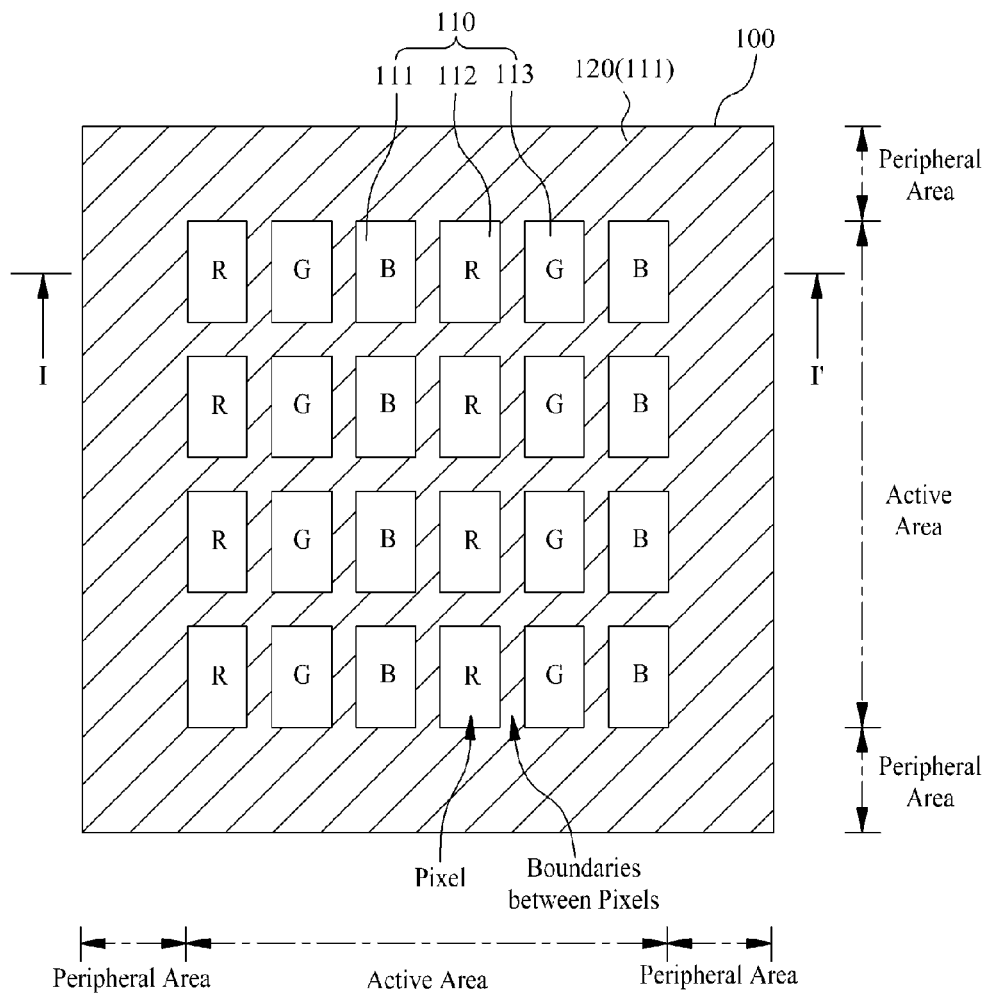
FIG. 2 is a plan view illustrating a first substrate of an LCD device according to an embodiment of the present invention.

Hereinafter, embodiments of the present invention will be described with reference to the accompanying drawings. FIG. 2 is a plan view illustrating a first substrate of an LCD device according to an embodiment of the present invention.

As illustrated in FIG. 2, a first substrate 100 according to the present invention may include an active area and a peripheral area. The active area corresponds to an area for displaying images thereon, and the peripheral area corresponds to an area surrounding the active area, on which images are not displayed.

In the active area, a light shielding layer 120 is formed in a matrix configuration. Each individual pixel is formed between each region of the light shielding layer 120. That is, the region provided with the light shielding layer 120 may serve as the boundaries between the pixels. The light shielding layer 120 is also formed in an entire region of the peripheral area in FIG. 2. A light shielding layer according to the present invention is not limited to this structure. For example, the light shielding layer 120 may not be formed in an end portion of the first substrate 100.

A color filter layer 110 is formed in each individual pixel between each region of the light shielding layer 120 inside the active area. The color filter layer 110 may include a first color filter 111, a second color filter 112, and a third color 113. That is, any one of the first color filter 111, the second color filter 112 and the third color filter 113 is formed in each individual pixel.

The first color filter 111 is formed in the active area and the peripheral area. In detail, the first color filter 111 is formed in the boundaries between the pixels inside the active area. In addition, the first color filter 111 may be formed on the entire region of the peripheral area. Especially, the first color filter 111 is formed between the light shielding layer 120 and the first substrate 100. According to an embodiment of the present invention, the first color filter 111 is formed between the light shielding layer 120 and the first substrate 100 to decrease a reflectance difference between the active area and the peripheral area in response to external light.

The first color filter 111 may be formed of a blue color filter (B), the second color filter 112 is formed of a red color filter (R), and the third color filter 113 is formed of a green color filter (G). Beneficially, the first color filter 111, which is provided in each individual pixel between the light shielding layer 120 and the first substrate 110, is formed of the blue color filter (B).

Figure 3:
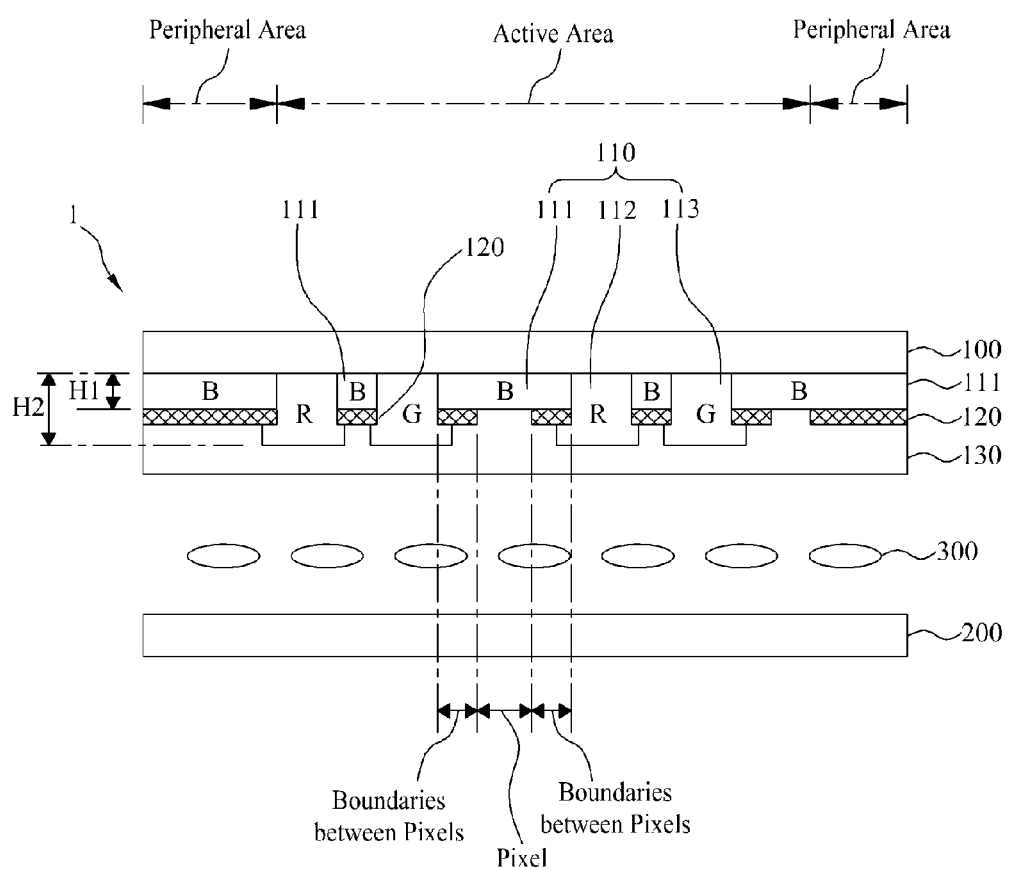
FIG. 3 is a cross-sectional view along line I-I' of FIG. 2 according to an embodiment of the present invention.

FIG. 3 is a cross-sectional view along line I-I' of FIG. 2 according to an embodiment of the present invention.

As illustrated in FIG. 3, an LCD device according to an embodiment of the present invention may include the first substrate 100, a second substrate 200, and a liquid crystal layer 300. On the first substrate 100, and more particularly, its one surface confronting the liquid crystal layer 300, are the color filter layer 110, the light shielding layer 120, and an overcoat layer 130.

The color filter layer 110 may include the first color filter 111, the second color filter 112, and the third color filter 113. The first color filter 111 is different in structure from the second and third color filters 112 and 113. The first color filter 111 is formed not only in the active area but also in the peripheral area. Also, the first color filter 111 is formed in each individual pixel inside the active area, and is also formed in the boundaries between the pixels.

However, the second color filter 112 and the third color filter 113 may not be formed in the peripheral area, but formed in the active area. In more detail, each of the second color filter 112 and the third color filter 113 is formed in each individual pixel inside the active area. Also, the second color filter 112 and the third color filter 113 may not be formed in the boundaries between the pixels. As illustrated in FIG. 3, each of the second color filter 112 and the third color filter 113 may overlap with a predetermined portion of the light shielding layer 120 in the boundaries between the pixels. If needed, each of the second color filter 112 and the third color filter 113 may overlap with the light shielding layer 120 in the entire region of the boundaries between the pixels.

The light shielding layer 120 is formed on the first color filter 111. Except that the light shielding layer 120 is not formed in each individual pixel, the light shielding layer 120 is identical in pattern to the first color filter 111. In the peripheral area, the light shielding layer 120, which is formed on the first color filter 111, is identical in pattern to the first color filter 111. In the boundaries between the pixels of the active area, the light shielding layer 120, which is formed on the first color filter, is identical in pattern to the first color filter 111.

In this description, the same pattern does not mean that the both patterns are exactly the same. That is, margins of error, which might occur during a manufacturing process, should be taken into consideration.

According to an embodiment of the present invention, the first color filter 111 is formed on the first substrate 100, the light shielding layer 120 is formed on the first color filter 111, and the second color filter 112 and the third color filter 113 are formed on the light shielding layer 120. As illustrated in FIG. 3, the first color filter 111 has a first thickness (H1), and each of the second color filter 112 and the third color filter 113 has a second thickness (H2) which is greater than the first thickness (H1).

Figure 1A:
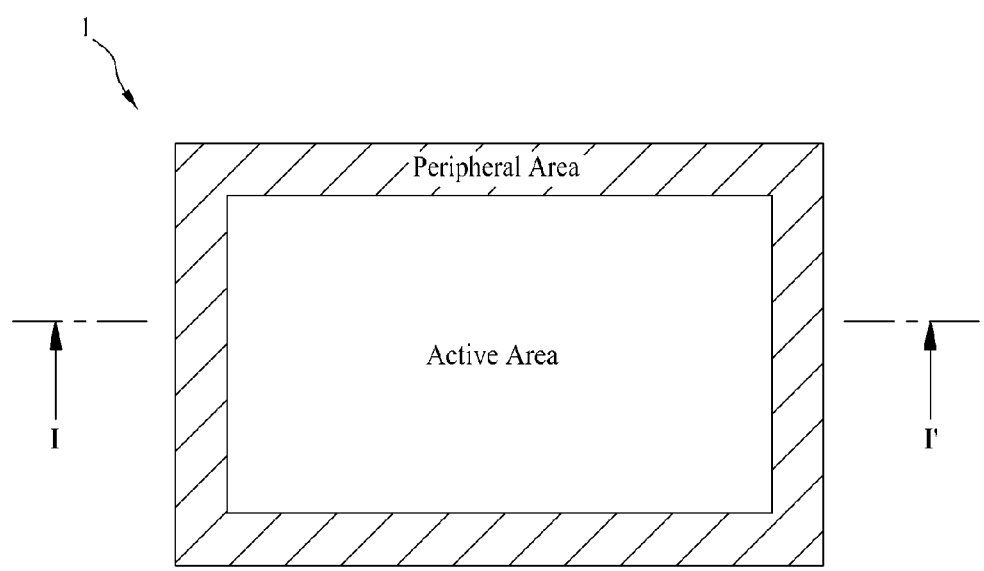
FIG. 1A is a plan view showing an LCD device according to the related art.
Figure 1B:
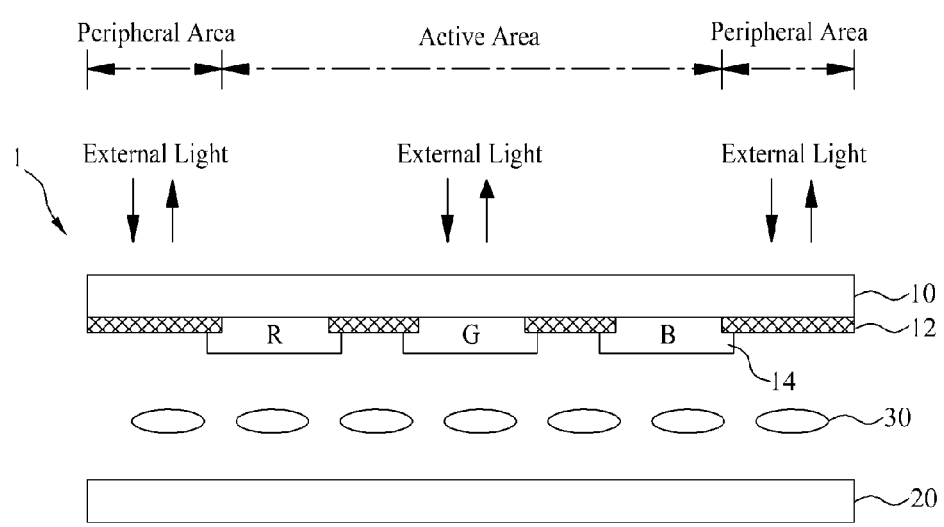
FIG. 1B is a cross-sectional view along line I-I' of FIG. 1A.

According to an embodiment of the present invention, the external light incident on the peripheral area passes through the first color filter 111 and is then reflected on the light shielding layer 120. As compared with the LCD device according to the related art, wherein the external light is reflected on the light shielding layer 12 in FIG. 1B, the reflectance of the external light in the peripheral area of an LCD device according to the present invention is relatively lower. Thus, it is possible to decrease the reflectance difference between the active area and the peripheral area in response to external light in an LCD device according to the present invention, to thereby improve the user's visual perception characteristics.

FIG. 4 is a table showing the reflectance of external light when the first color filter between the first substrate and the light shielding layer is changed to various color filters.

In FIG. 4, comparative example 1 shows that a light shielding layer (BM) is not formed on a glass substrate (S), and comparative example 2 shows that a light shielding layer (BM) is formed on a glass substrate (S). While the reflectance of comparative example 1 is 7.89%, the reflectance of comparative example 2 is sharply increased to 12.03%.

Each of embodiments 1 to 3 shows that a color filter is formed between a glass substrate (S) and a light shielding layer (BM). The reflectance in each of embodiments 1 to 3 is relatively lower than the reflectance of comparative example 2. Especially, the reflectance of embodiment 3, which includes a blue color filter (B) between the glass substrate (S) and the light shielding layer (BM) is relatively lower than the reflectance of embodiment 1, which includes a red color filter (R) between the glass substrate (S) and the light shielding layer (BM), or the reflectance of embodiment 2, which includes a green color filter (G) between the glass substrate (S) and the light shielding layer (BM).

Thus, as illustrated in FIG. 3, the first color filter 111 is beneficially formed of the blue color filter (B). However, a first substrate of an LCD device according to the present invention is not limited to this structure. It is possible to form the first color filter 111 with a red color filter (R) or a green color filter (G).

Referring back to FIG. 3, the overcoat layer 130 may be formed on the color filter layer 110 and the light shielding layer 120. The overcoat layer 130 is provided to planarize the surface of the first substrate 100.

The second substrate 200 and the first substrate 100 are confronting each other. On the second substrate 200, and more particularly, its one surface confronting the liquid crystal layer 300, are a thin film transistor functioning as a switching element, a pixel electrode connected with the thin film transistor, and a common electrode for forming an electric field together with the pixel electrode.

The thin film transistor may include a gate electrode, a semiconductor layer, a source electrode, and a drain electrode. The thin film transistor may have various shapes generally known to those of ordinary skill in the art. For example, the thin film transistor may be formed in a top gate structure where the gate electrode is formed on the semiconductor layer, or may be formed in a bottom gate structure where the gate electrode is formed under the semiconductor layer.

The pixel electrode is electrically connected with the drain electrode of the thin film transistor. The pixel electrode and the common electrode may also have various shapes generally known to those of ordinary skill in the art, for example, a fork shape.

An LCD device according to the present invention may be applied to various driving modes. That is, an LCD device according to the present invention may be applied to various driving modes generally known to those of ordinary skill in the art, for example, In-Plane Switching (IPS) mode, Twisted Nematic (TN) mode, Vertical Alignment (VA) mode, or Fringe Field Switching (FFS) mode. In this case, the structure of elements formed on one surface of the first substrate 100 or second substrate 200 may vary according to the driving mode of the LCD device.

The liquid crystal layer 300 is formed between the first substrate 100 and the second substrate 200. Liquid crystal molecules included in the liquid crystal layer 300 are aligned by the electric field between the pixel electrode and the common electrode.

Although not shown, a sealant is formed along the edges of the first substrate 100 and the second substrate 200, whereby the first substrate 100 and the second substrate 200 are bonded to each other by the sealant.

Figure 5:
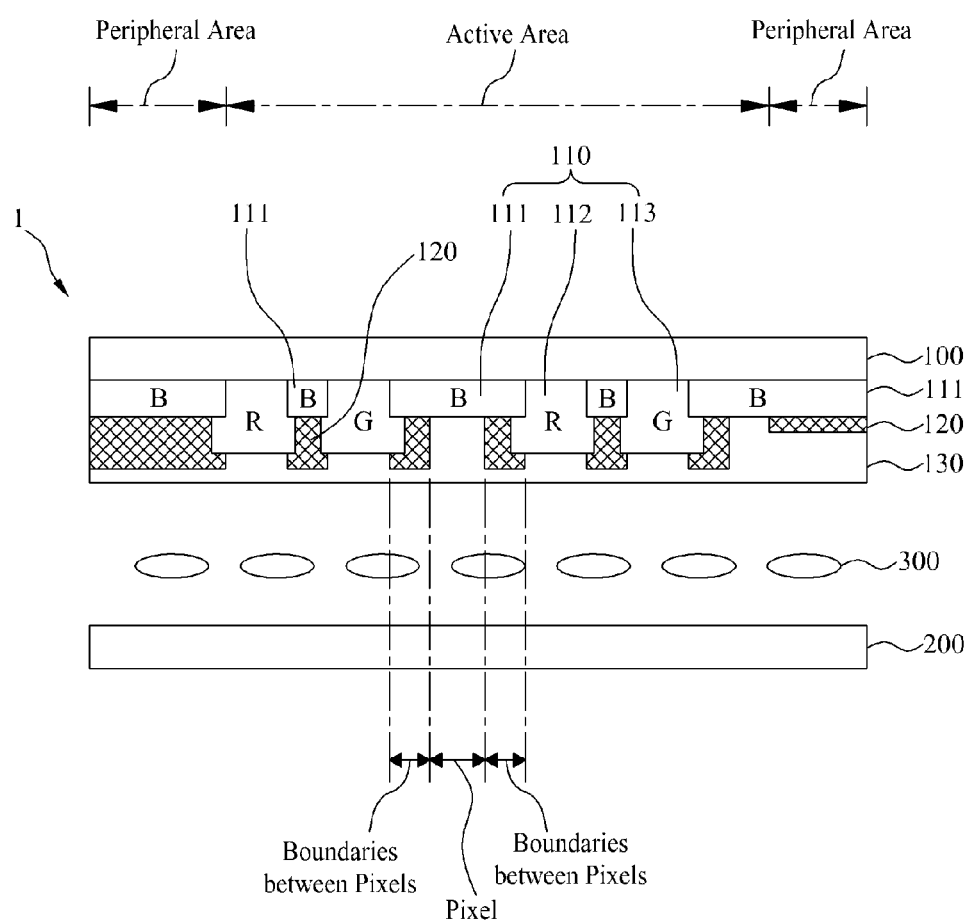
FIG. 5 is a cross sectional view along line I-I' of FIG. 2 according to another embodiment of the present invention.

FIG. 5 is a cross-sectional view along line I-I' of FIG. 2 according to an embodiment of the present invention. Except that a color filter layer 110 and a light shielding layer 120 are changed in their positions, an LCD device according to another embodiment of the present invention is identical in structure to the above LCD device of FIG. 3. Thus, the same reference numbers will be used throughout the drawings to refer to the same or like parts, and the detailed description for the same parts will be omitted.

Referring to FIG. 3, the first color filter 111 is formed on the first substrate 100, the light shielding layer 120 is formed on the first color filter 111, and the second and third color filters 112 and 113 are formed on the light shielding layer 120. That is, as illustrated in FIG. 3, the light shielding layer 120 is formed between the first color filter 111 and the second and third color filter 112 and 113.

Meanwhile, referring to FIG. 5, a first color filter 111 is formed on a first substrate 100, second and third color filters 112 and 113 are formed on the first color filter 111, and a light shielding layer 120 is formed between the second color filter 112 and the third color filter 113. That is, as illustrated in FIG. 5, the second color filter 112 is formed between the first color filter 111 and the light shielding layer 120, and the third color filter 113 is formed between the first color filter 111 and the light shielding layer 120. In the same manner as in the FIG. 3, the LCD device shown in FIG. 5 beneficially includes the first color filter 111 of a blue color filter (B).

FIG. 6 is a table showing the reflectance of external light when the first color filter between the first substrate and the light shielding layer is changed to various color filters.

As illustrated in FIG. 6, comparative example 1 shows that a light shielding layer (BM) is not formed on a glass substrate (S), and comparative example 2 shows that a light shielding layer (BM) is formed on a glass substrate (S). While the reflectance of comparative example 1 is 7.89%, the reflectance of comparative example 2 is sharply increased to 12.03%.

Each of embodiments 4 to 6 shows that a color filter is formed between a glass substrate (S) and a light shielding layer (BM). The reflectance in each of embodiments 4 to 6 are relatively lower than the reflectance of comparative example 2. Especially, the reflectance of embodiment 6, which includes a blue color filter (B) on a glass substrate (S), a red color filter (R) on the blue color filter (B), and a light shielding layer (BM) on the red color filter (R), is relatively lower than embodiment 4, which includes a red color filter (R) on a glass substrate (S), a green color filter (G) on the red color filter (R), and a light shielding layer (B) on the green color filter (G); or embodiment 5, which includes a green color filter (G) on a glass substrate (S), a blue color filter (B) on the green color filter (G), and a light shielding layer (BM) on the blue color filter (B).

Thus, as illustrated in FIG. 5, the first color filter 111 is beneficially formed of the blue color filter (B). However, a first substrate of an LCD device according to the present invention is not limited to this structure. It is possible to form the first color filter 111 with a red color filter (R) or a green color filter (G).

Figure 7:
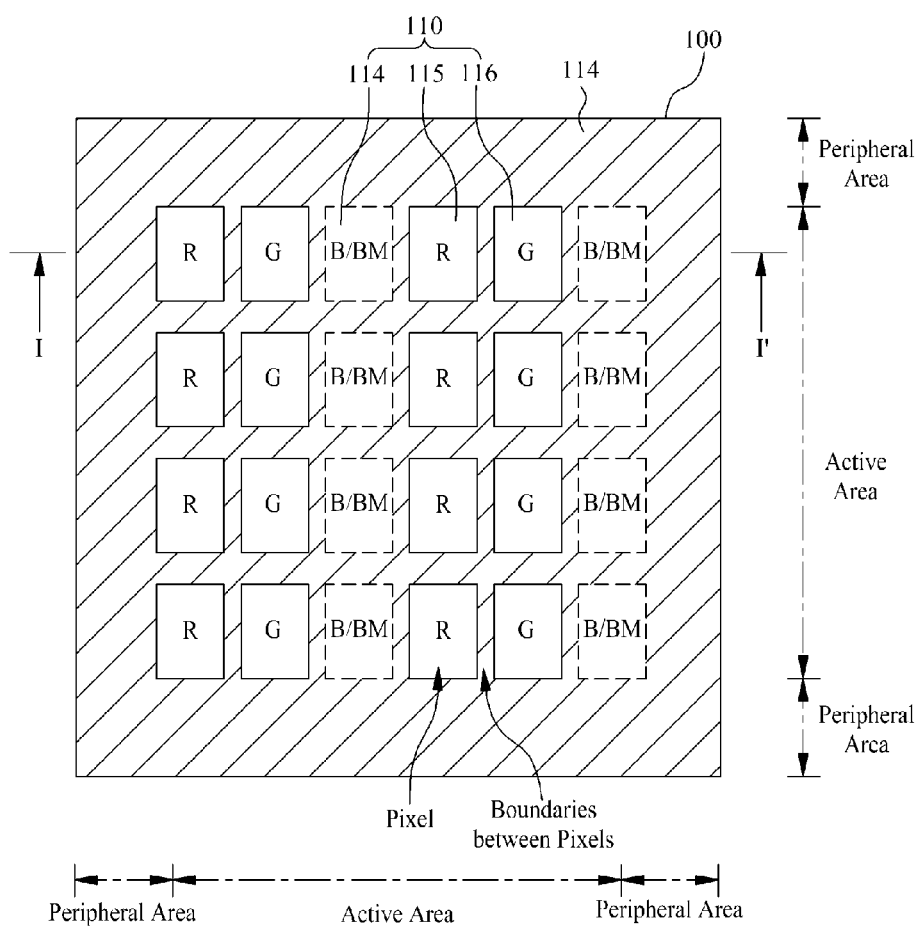
FIG. 7 is a plan view illustrating a first substrate of an LCD device according to another embodiment of the present invention.

FIG. 7 is a plan view illustrating a first substrate of an LCD device according to another embodiment of the present invention, wherein the repetitive description for the same parts as those of the above embodiments will be omitted.

As illustrated in FIG. 7, a first substrate 100 of an LCD device according to another embodiment of the present invention may include an active area and a peripheral area. Each individual pixel in the active area includes a color filter layer 110 that may further include a fourth color filter 114, a fifth color filter 115 and a sixth color filter 116. The fourth color filter 114 performs color-filtering and light-shielding functions at the same time. The fifth color filter 115 and the sixth color filter perform only the color-filtering function.

In this embodiment, the fourth color filter 114 performs the light-shielding function so that it is unnecessary to provide an additional light-shielding layer. That is, the additional light shielding layer is not formed in the boundaries between pixels of the active area, and the fourth color filter 114 is formed in the boundaries between pixels. For convenience of description, the pixel provided with the fourth color filter 114 is shown in a dotted line to distinguish the pixel provided with the fourth color filter 114 from the boundaries of neighboring pixels.

Also, the fourth color filter 114 is formed in the peripheral area. The fourth color filter 114 is formed in the entire region of the peripheral area. A fourth color filter according to the present invention is not limited to this structure. For example, the fourth color filter 114 may not be formed in an end portion of the first substrate 100.

According to another embodiment of the present invention, the fourth color filter 114, which performs both the color-filtering and light-shielding functions, is formed in the active area and the peripheral area so that it is possible to decrease the reflectance difference of external light between the active area and the peripheral area.

The fourth color filter 114 may include a pigment or dye (hereinafter, referred to as 'pigment') for the color-filtering function, and may include a light-shielding material for the light-shielding function. In addition, the fourth color filter 114 may include a binder for connection of the pigment and the light-shielding material. The pigment may be a red, green or blue pigment. It is beneficial that the pigment is a blue pigment. The light-shielding material may be a carbon black, but not limited to this material. The binder may be formed of various kinds of materials generally known to those of ordinary skill in the art.

The fourth color filter 114 may include about 5 to about 30 weight % pigment. If the pigment is less than about 5 weight %, the color-filtering function of the fourth color filter 114 may be deteriorated. Meanwhile, if the pigment is more than about 30 weight %, the light-shielding function of the fourth color filter 114 may be deteriorated. Also, the fourth color filter 114 may include about 40 to about 60 weight % light-shielding material. If the light-shielding material is less than about 40 weight %, the light-shielding function of the fourth color filter 114 may be deteriorated. Meanwhile, if the light-shielding material is more than about 60 weight %, the color-filtering function of the fourth color filter 114 may be deteriorated. The binder may be included within a range of about 10 to about 55 weight % of the fourth color filter 114. If the binder is less than about 10 weight %, it may be difficult to form the fourth color filter 114. Meanwhile, if the binder is more than about 55 weight %, the functions of the fourth color filter 114 may be deteriorated.

Figure 8:
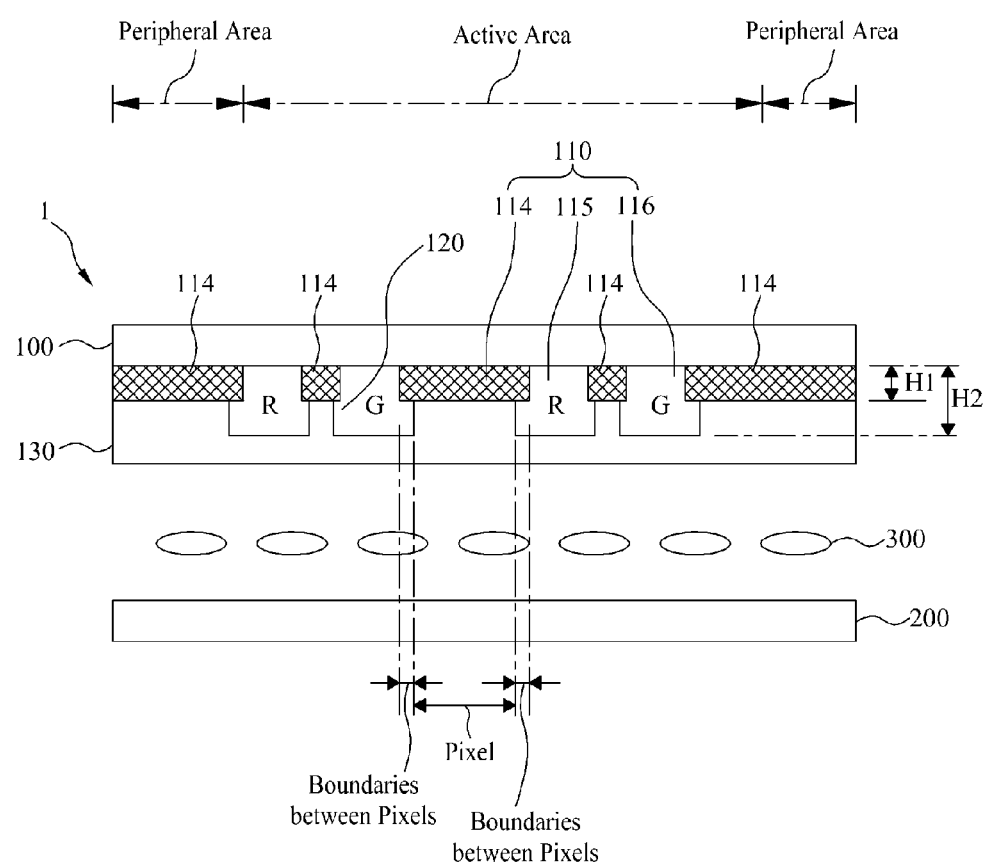
FIG. 8 is a cross sectional view along line I-I' of FIG. 7 according to another embodiment of the present invention.

FIG. 8 is a cross-sectional view along line I-I' of FIG. 7 according to another embodiment of the present invention.

As illustrated in FIG. 8, an LCD device according to another embodiment of the present invention may include a first substrate 100, a second substrate 200, and a liquid crystal layer 300. The second substrate 200 and the liquid crystal layer 300 are identical in structure to those of the LCD devices according to the above embodiments of the present invention. Hereinafter, only the first substrate 100 will be described in detail.

On the first substrate 100, and more particularly, its one surface confronting the liquid crystal layer 300, are a color filter layer 110, and an overcoat layer 130 on the color filter layer 110. The color filter layer 110 may include a fourth color filter 114, a fifth color filter 115, and a sixth color filter 116. The fourth color filter 114 is different in structure from those of the fifth and sixth color filters 115 and 116. The fourth color filter 114 is formed in the peripheral area as well as the active area. Also, the fourth color filter 114 is formed in each individual pixel of the active area, and is also formed in the boundaries between the pixels.

The fifth color filter 115 and the sixth color filter 116 are, however, formed not in the peripheral area but in the active area. In detail, each of the fifth color filter 115 and the sixth color filter 116 is formed in individual pixel of the active area. Also, the fifth color filter 115 and the sixth color filter 116 may not be formed in the boundaries between the pixels. As illustrated in FIG. 8, the fifth color filter 115 and the sixth color filter 116 may partially overlap with the fourth color filter 114 in the boundaries between the pixels. If needed, the fifth color filter 115 and the sixth color filter 116 may overlap with the fourth color filter 114 in the entire region of the boundaries between the pixels.

In this embodiment, the fourth color filter 114 is formed on the first substrate 100, and the fifth color filter 115 and the sixth color filter 116 may be formed on the fourth color filter 114. Thus, as illustrated in FIG. 8, the fourth color filter 114 has a first thickness (H1), and each of the fifth color filter 115 and the sixth color filter 116 has a second thickness (H2), which is greater than the first thickness (H1).

According to another embodiment of the present invention, the external light incident on the peripheral area is reflected on the fourth color filter 114. As compared with the LCD device according to the related art, wherein the external light is reflected on the light shielding layer 12 in FIG. 1B, the reflectance of external light in the peripheral area of an LCD device according to the present invention is relatively lower. Thus, it is possible to decrease the reflectance difference between the active area and the peripheral area in response to external light in an LCD device according to the present invention, to thereby improve the user's visual perception characteristics.

Figure 9:
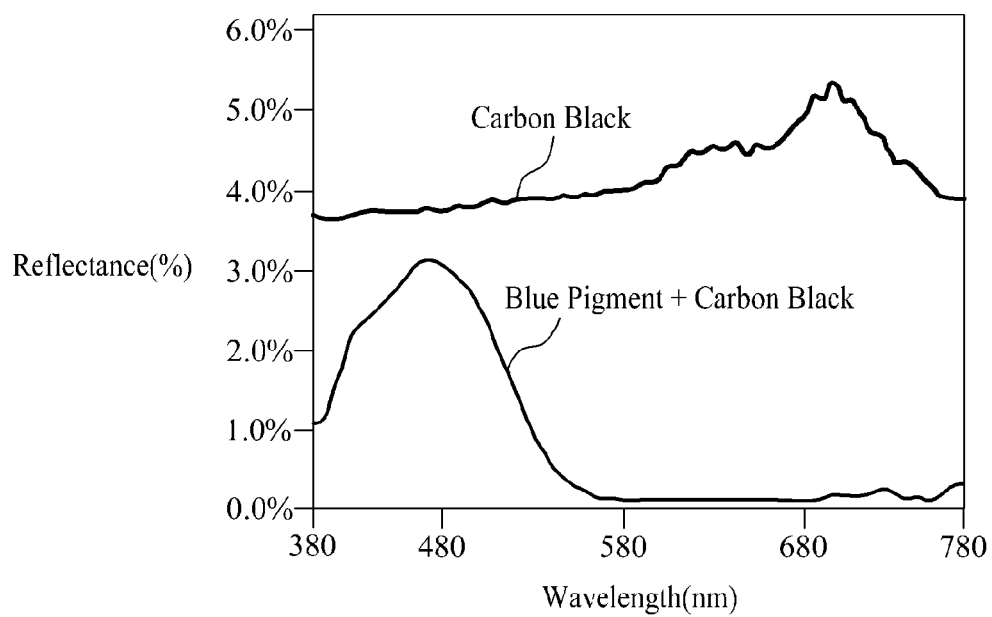
FIG. 9 is a graph showing the reflectance of external light on a fourth color filter according to the present invention.

FIG. 9 is a graph showing the reflectance of external light on the fourth color filter according to the present invention.

As shown in FIG. 9, the reflectance of external light on the mixture of a blue pigment and a carbon black is much lower than the reflectance of external light on the carbon black used as the material of the light-shielding layer. When the fourth color filter including the pigment and the light-shielding material is applied instead of the light shielding layer, the reflectance is lowered in comparison to the related art.

According to another embodiment of the present invention, the first color filter 111 is formed between the light shielding layer 120 and the first substrate 100 so that it is possible to decrease the reflectance difference between the active area and the peripheral area in response to external light, to thereby improve the user's visual perception characteristics. Also, instead of the light shielding layer, the fourth color filter 114 is formed in the active area as well as the peripheral area, whereby it is possible to decrease the reflectance difference between the active area and the peripheral area in response to external light, to thereby further improve the user's visual perception characteristics.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device, comprising:
a first substrate including an active area and a peripheral area;
a second substrate confronting the first substrate;
a liquid crystal layer between the first and second substrates;
a light shielding layer in the active area and the peripheral area of the first substrate;
first, second and third color filters respectively in individual pixels of the active area; and
an overcoat layer covering the light shielding layer and the first, second and third color filters,
wherein the first color filter comprises a first portion between the first substrate and the light shielding layer in the active area and the peripheral area and a second portion in a pixel among the individual pixels of the active area, and wherein the first portion of the first color filter is overlapped with an entire area of the light shielding layer in a cross-sectional view, and
wherein a thickness of the first portion of the first color filter is same as a thickness of the second portion of the first color filter and the thickness of each of the first portion and the second portion of the first color filter is different from a thickness of the second and third color filters, and
wherein the overcoat layer is in contact with the second portion of the first color filter.

2. The LCD device of claim 1, wherein the light shielding layer is between the first color filter and the second color filter, and between the first color filter and the third color filter.

3. The LCD device of claim 1, wherein the second color filter is between the first color filter and the light shielding layer, and the third color filter is between the first color filter and the light shielding layer.

4. The LCD device of claim 1, wherein a thickness of the second color filter is greater than a thickness of the first color filter, and a thickness of the third color filter is greater than the thickness of the first color filter.

5. The LCD device of claim 1, wherein the first color filter is of a blue color filter.

6. The LCD device of claim 1, wherein the second and third color filters are exclusively in the active area.

7. The LCD device of claim 1, wherein each of the second and third color filters overlap a portion of the light shielding layer in the active area.

8. The LCD device of claim 1, wherein the first color filter and the light shielding layer between the at least two neighboring pixels in the active area have a same pattern.

9. The LCD device of claim 1, wherein a reflectance from the first color filter on the light shielding layer is lower than that from the light shielding layer alone.

10. A liquid crystal display (LCD) device, comprising:
a first substrate including an active area and a peripheral area;
a second substrate confronting the first substrate;
a liquid crystal layer between the first and second substrates;
fourth, fifth and sixth color filters respectively in individual pixels of the active area in a matrix configuration; and
an overcoat layer covering the fourth, fifth and sixth color filters,
wherein the fourth color filter is a composition of a pigment, a light-shielding material dispersed in the pigment, and a binder for binding the pigment and the light-shielding material and is additionally in the peripheral area,
wherein the fourth color filter comprises a first portion between at least two neighboring pixels in the active area and a second portion in a pixel among the individual pixels of the active area, and a thickness of the first portion of the fourth color filter is same as a thickness of the second portion of the fourth color filter and the thickness of each of the first portion and the second portion of the fourth color filter is different from a thickness of the fifth and sixth color filters, and
wherein the overcoat layer is in contact with the second portion of the fourth color filter.

11. The LCD device of claim 10, wherein the pigment has a blue color.

12. The LCD device of claim 10, wherein the pigment is included within a range of about 5 to about 30 weight % of the fourth color filter, and the light-shielding material is included within a range of about 40 to about 60 weight % of the fourth color filter.

13. The LCD device of claim 10, wherein a thickness of the fifth color filter is greater than a thickness of the fourth color filter, and a thickness of the sixth color filter is greater than the thickness of the fourth color filter.

14. The LCD device of claim 10, wherein the fifth and sixth color filters are exclusively in the active area.

15. The LCD device of claim 14, wherein the fifth and sixth color filters in the active area are on the fourth color filter in the active area.

16. The LCD device of claim 10, wherein each of the fifth and sixth color filters in the active area overlap a portion of the fourth color filter in the matrix configuration.

17. The LCD device of claim 10, wherein the light-shielding material includes a carbon black.

18. A liquid crystal display (LCD) device, comprising:
a first substrate including a first pixel, a second pixel and a third pixel in an active area;
a second substrate confronting the first substrate;
a liquid crystal layer between the first and second substrates;
a first color filter in the first pixel on the first substrate;
a second color filter in the second pixel on the first substrate;

a third color filter in the third pixel on the first substrate; and an overcoat layer covering the first, second and third color filters, wherein the first color filter comprises a first portion provided in every boundary area between pixels in the active area including between the first pixel and the second pixel, between the first pixel and the third pixel, and between the second pixel and the third pixel, a second portion in the first pixel wherein the first color filter consists of a blue color filter, and wherein a thickness of the first portion of the first color filter is same as a thickness of the second portion of the first color filter and the thickness of each of the first portion and the second portion of the first color filter is different from a thickness of the second and third color filters, and wherein the overcoat layer is in contact with the second portion of the first color filter.

19. The LCD device of claim 18, further comprising a light shielding layer between the first pixel and the second pixel, between the first pixel and the third pixel, and between the second pixel and the third pixel, wherein the first color filter is provided between the first substrate and the light shielding layer, and the first color filter is overlapped with the light shielding layer.

20. The LCD device of claim 18, wherein the first color filter is of a pigment and a light-shielding material.

* * * * *